United States Patent [19]

Song

[11] 4,193,020
[45] Mar. 11, 1980

[54] PHASE LOCK CONTROL SYSTEM WITH TRAJECTORY CORRECTION

[75] Inventor: Hubert Song, Sunnyvale, Calif.

[73] Assignee: Sperry Rand Corporation, New York, N.Y.

[21] Appl. No.: 908,038

[22] Filed: May 22, 1978

[51] Int. Cl.$^2$ .............................................. H02P 5/16
[52] U.S. Cl. .................................... 318/314; 318/318; 318/341
[58] Field of Search ........................ 318/314, 318, 341

[56] References Cited

U.S. PATENT DOCUMENTS

| | | | |
|---|---|---|---|
| 3,361,949 | 1/1968 | Brown et al. | 318/314 |
| 3,478,178 | 11/1969 | Grace | 318/318 |
| 3,668,492 | 6/1972 | Konishi et al. | 318/314 |
| 3,952,237 | 4/1976 | Kimizuka | 318/314 |

*Primary Examiner*—David Smith, Jr.
*Attorney, Agent, or Firm*—Thomas H. Olson; Eugene T. Battjer; William E. Cleaver

[57] ABSTRACT

A phase lock system for locking the output pulses of a motor driven tachometer in phase with reference pulses that recur at a prescribed reference frequency. A phase/frequency detector operates in a frequency mode when there is a frequency difference between the output pulses and the reference pulses so as to generate an error signal indicative of the frequency difference and a saturating amplifier coupled between the phase/frequency detector and the tachometer motor responds to the error signal to provide maximum drive power to the motor so as to vary the tachometer and drive the output pulse frequency toward the reference pulse frequency at a maximum rate. When frequency equality is achieved, the phase/frequency detector operates in a phase mode in which the phase error between the output pulses and the reference pulses is measured at a time when the system is still in saturation because of its high gain. A phase error rate signal is derived from another phase detector responsive to the phase error to produce a counter torque pulse having a duration related to the phase error rate. Such counter torque pulse is applied momentarily to override the effect of the phase error signal so as to drive the saturating amplifier briefly into saturation in the opposite direction as phase lock is approached whereby the motor is slowed as it approaches phase lock in order to assure phase lock without oscillation upon entry into the linear region of the amplifier.

7 Claims, 5 Drawing Figures

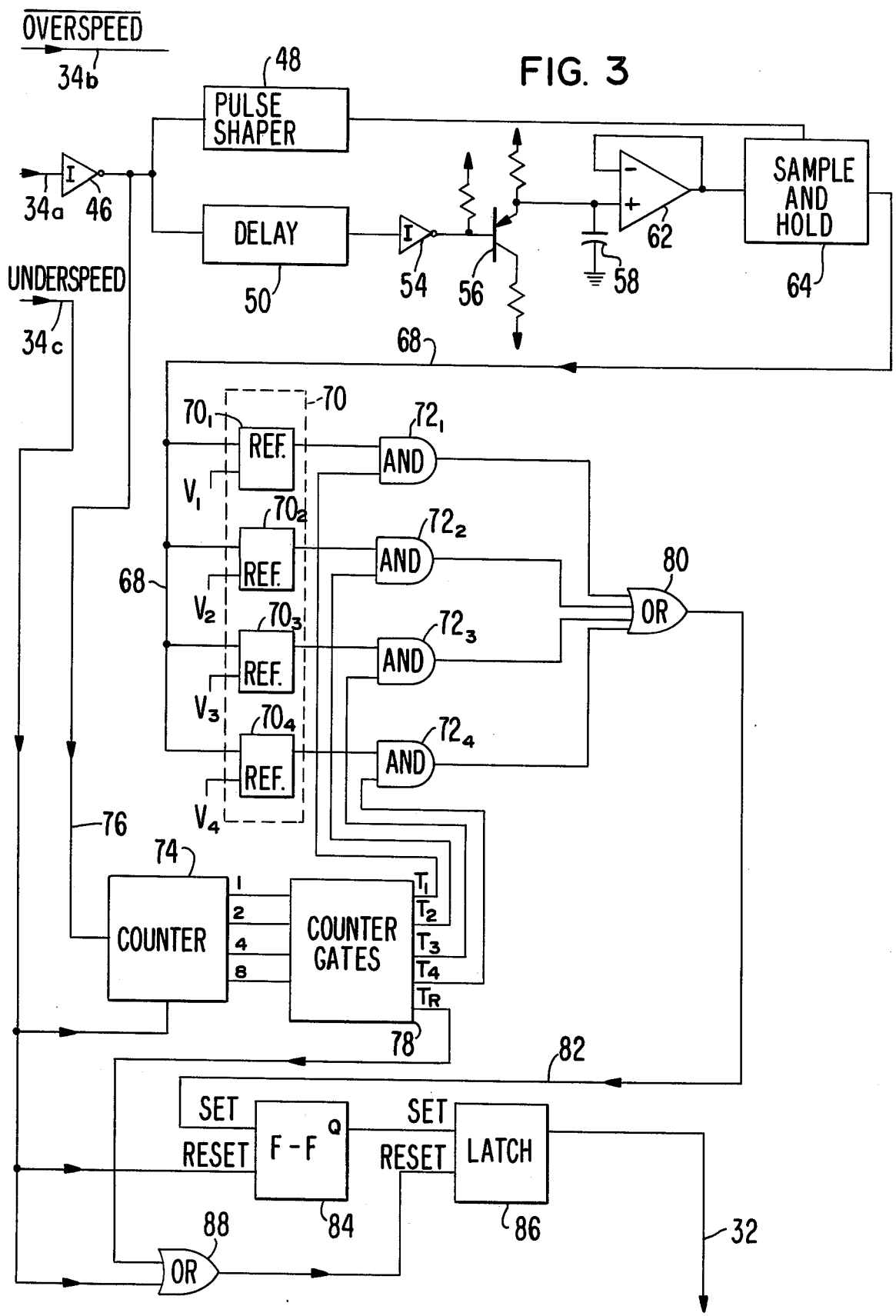

PHASE LOCK CONTROL SYSTEM WITH TRAJECTORY CORRECTION

BACKGROUND OF THE INVENTION

1. Field of the Invention

This invention relates to a phase lock loop control system and more particularly to a system for rapidly bringing a variable output pulse signal into phase lock with a reference pulse signal in cases where the starting frequency of the output pulse signal is substantially different from the frequency of the reference pulse.

2. Description of the Prior Art

Because the present invention will be described hereinafter in connection with a phase lock motor speed control, the prior art with respect to such motor controls is pertinent. Phase lock speed control systems are employed in applications where the speed of the motor must be precisely correlated to the frequency of a series of clock pulses or like reference pulses that recur at regular intervals. Exemplary applications include video recorders, in which the speed of a read-write head must be synchronized with sync pulses from a horizontal oscillator, and data recording systems, in which the relative speed of a read-write head and a magnetic tape must be synchronized with a clock pulse generated within the system of which the motor that drives the read-write head is a part. The speed of the motor is changed by changing the frequency of the reference pulses; it is desirable to minimize the time required for the motor to change speed and achieve lock with the reference pulses.

Both the known prior art and the present invention employ a phase lock loop which drives a motor by means of a saturating amplifier until the motor approaches a speed that corresponds to a clock or reference pulse rate. One prior art technique for minimizing the time required for lock is to employ a low gain in the phase lock loop so that the motor can move into the linear range of operation without oscillation or like instabilities. Low loop gain is not satisfactory for precision speed control, however, because a substantial residual phase error exists.

Another prior art technique which avoids the problems of continuous low gain involves gain switching so that the system operates in a low gain mode as the motor approaches and enters the linear range and then switches to a high gain mode after lockup is achieved. Since gain is lower, the settling time is longer. Also, because of disturbances or transients injected when the system switches, time for the effect of the disturbances or transients to subside must be provided before a true locked condition results.

SUMMARY OF THE INVENTION

By contrast to the above summarized prior art techniques, the present invention achieves rapid lockup without significant oscillation and operates at all times in the high gain mode so that accuracy is achieved and disturbances during gain switching are eliminated. According to the present invention, as the motor speed approaches the desired speed, the phase difference between the system clock pulses and the tachometer pulses and the rate of change of that phase difference are measured and both are employed to produce a counter torque signal which slows the motor by an appropriate degree just as it enters the linear region of operation.

In the preferred form of the invention, which is described in more detail hereinafter, there is circuitry for producing one of a plurality of counter torque pulses so that irrespective of the initial conditions present upon approach to lockup, a counter torque pulse of appropriate magnitude can be generated.

Accordingly, the principal object of the present invention is to provide a phase lock control system active in achieving lockup from a condition in which the difference between the frequency of the reference clock pulse and the output pulse is substantial. This object is achieved by providing a fixed high loop gain, applying a driving signal to drive the output pulse generating device in saturation to maximize acceleration toward the clock speed, operating in a phase detection mode when frequency equality is reached and momentarily applying to the output pulse generating device a counter torque pulse which overrides the driving signal just before the loop enters the linear range from the saturation range. The duration of the counter torque pulse is established by measuring the time rate of change of the phase difference between the output pulse and the reference pulse to produce an error rate signal, and using such error rate signal to establish the duration of the counter torque pulse. Thus, if the time rate of change of phase error is great, a relatively wide counter torque pulse is applied, and if the time rate of change of phase error is small, a relatively narrow counter torque pulse is supplied.

The description herein of the present invention in connection with the motor speed control is exemplary because the invention can be employed to hasten lockup in virtually any phase lock control system.

BRIEF DESCRIPTION OF THE DRAWINGS

FIG. 3 is a block diagram of the trajectory correcting the system of the invention.

DETAILED DESCRIPTION OF A PREFERRED EMBODIMENT

Figure 1:
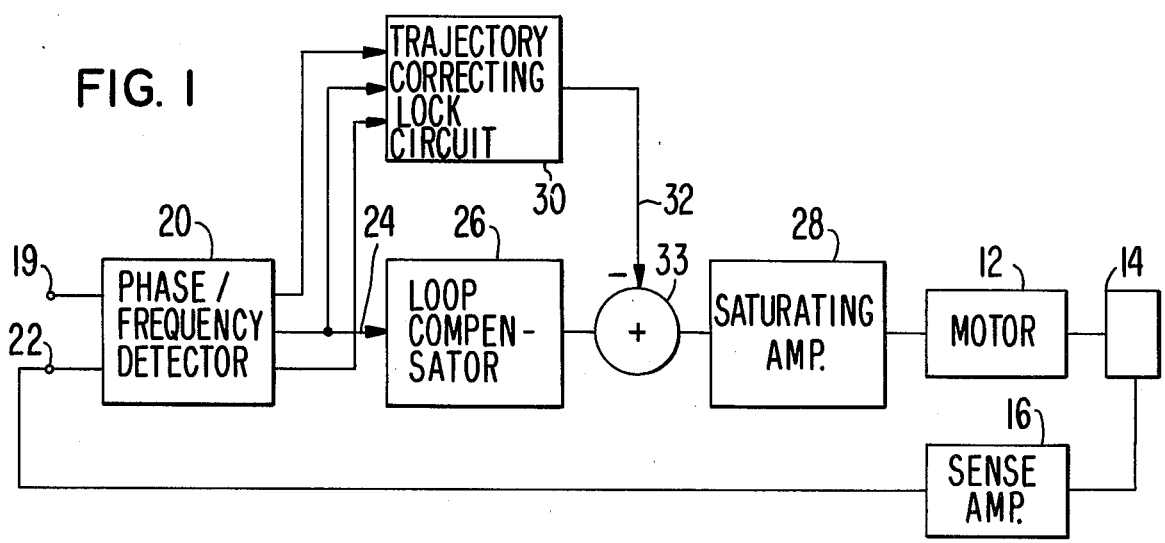
FIG. 1 is a block diagram of a system embodying the invention.

Referring more particularly to the drawings, reference numeral 12 indicates a motor which has a shaft that drives a tachometer 14. The tachometer produces output pulses at a frequency proportional to the speed of rotation of the motor. The output of tachometer 14 is connected to a sense amplifier 16 which shapes and amplifies the tachometer pulses to produce output pulses 17 that vary in frequency in correspondence to the speed of motor 12. Motor 12, tachometer 14 and sense amplifier 16 constitute a variable pulse generator which produces output pulses at a rate that can be controlled by controlling the power input to motor 12. The motor shaft can be connected to a data storage unit and functions to effect relative movement between a magnetizable medium, such as magnetic tape, and a read/write head very accurately. The system produces a clock pulse or reference pulse 18 which is supplied to an input terminal 19 of a phase/frequency detector 20. Sense amplifier 16 is constructed such that the shape of pulses 17 is substantially identical to the shape of reference pulses 18. Phase/frequency detector 20 has a second input 22 to which output pulses 17 are connected.

Phase/frequency detector 20 has a phase error output terminal 24 for producing a phase error clock signal 25 that varies with the phase difference between the clock pulses 18 and the output signals 17. The right-hand end of phase error clock 25 in FIG. 4 indicates a locked condition; in the locked condition output pulses 17 lag reference pulses 18 by $\pi$ radians, the period of the reference pulses being $2\pi$ radians. Phase error clock 25 is connected to a loop compensator 26 which converts the phase error proportionally into a voltage that is compensated for loop stabilization, and the compensated voltage is fed to amplifier 28 which will saturate when the compensated signal gets out of a small range of phase error. The size of the range is defined by the gain of the amplifier. The output of saturating amplifier 28 drives motor 12 in a direction to reduce and eventually eliminate the phase error. When the phase error is reduced to zero, the system is locked.

Saturating amplifier 28 is a conventional element which has a high gain and produces an output that is linearly proportional to the input until the output becomes limited by the supply voltage. During operation in the locked condition the amplifier operates in the linear range and the accuracy of speed of motor 12 is dependent on the gain of the amplifier in that range. Such is the case because a relatively small change in phase error will produce a relatively large change in the control signal supplied to motor 12 so as rapidly to adjust the speed of the motor and the frequency of output pulses 17 in order to retain the system in a locked condition. Amplifier 28 at the opposite extremes of the linear range operates in saturation by which is meant that a maximum negative or positive voltage is applied to the motor irrespective of minor changes in the error signal supplied to the input of the saturating amplifier. The magnitude of the positive and negative saturation voltage ($+V$, $-V$) is typically dictated by the system power supply.

The elements described to this point have been employed by others before the present invention. According to the present invention, a noval trajectory correcting circuit 30 is provided. The trajectory correcting circuit receives inputs from phase/frequency detector 20, processes the inputs, and produces a counter torque signal 31. The duration of the counter torque signal is established such as to drive saturating amplifier 28 into saturation in the opposite or counter direction from which it operates while accelerating motor 12. The counter torque pulse controls the speed of motor 12 in order that it can move from a saturated or open loop mode of operation into a linear or controlled operation rapidly and without oscillation, resaturation or like instability. Counter torque signal 31 is supplied on a path 32 to a summing point 33 at the input of saturating amplifier 28.

Figure 2:
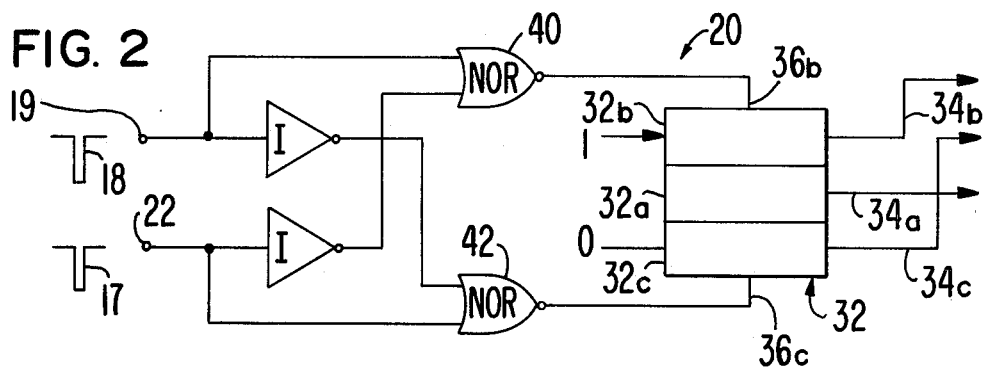
FIG. 2 is a block diagram of the phase/frequency detector employed in the invention.

Before disclosing the details of trajectory correcting lock circuit 30, a satisfactory implementation for phase/frequency detector 20 will be disclosed in connection with FIG. 2. Phase/frequency detector 20 operates in a frequency mode until the frequency of output pulses 17 equals the frequency of clock pulses 18. In the frequency mode, phase error clock signal 25 on output terminal 24 of detector 20 will be high when the output pulse frequency is less than the reference frequency and will be low when the output pulse frequency is greater than the reference frequency. If motor 12 begins from a stop position, the frequency of output pulses 17 is originally less than the frequency or clock pulses 18 so that the output pulse frequency approaches the clock frequency from a negative direction. If, on the other hand, the invention is incorporated into a system in which motor 12 rotates at a high rate, such that the frequency of the output pulses is greater than the clock frequency, detector 20 is constructed to detect frequency difference until the output pulse frequency is reduced to equality with the clock frequency. In the ensuing description, the case where motor 12 begins at a stopped position will be described, it being understood that the opposite mode of operation is substantially identical except for minor and obvious changes.

Phase/frequency detector 20 includes a three bit right-shift, left-shift register 32 which can be implemented, for example, by employing a 7495A commercially available integrated circuit. Register 32 includes a center cell 32a and opposite input cells 32b and 32c. The output of center cell 32a constitutes terminal 24 at which phase error clock signal 25 appears. The cells have output terminals respectively connected to circuit paths 34a, 34b and 34c. When the output pulse frequency and the clock frequency are substantially equal, a phase error clock signal 25 is produced on path 34a; when the output pulse frequency exceeds the clock frequency, an overspread signal 36 is produced on path 34b. The overspeed signal is converted to an overspeed signal by an inverter. When the output pulse frequency is less than the clock frequency, an underspeed signal 38 is produced on path 34c.

Cell 32b has an input 36b which is fed by a NOR gate 40 to the inputs of which are connected clock pulse 19 and inverted output pulse 17. Accordingly, the NOR gate produces an output only when a clock pulse occurs in the absence of an output pulse. Cell 32c has an input 36c which is fed by a NOR gate 42 to the inputs of which are connected tach pulses 17 and inverted clock pulses 18. Accordingly, NOR gate 42 produces an output only when an output pulse occurs simultaneous with absence of a clock pulse. The input circuitry constituted by the NOR gates and inverters cross inhibits the inputs to register 32 to prevent reaction to simultaneous occurrence of a clock pulse 18 and an output pulse 17. At the outset of operation, when two or more clock pulses occur between output pulses, input terminal 36b receives more pulses than input terminal 36c, thus causing a shift of digits down to cell 32c so that a true output or underspeed signal 38 occurs on path 34c and the phase error clock stays high. The high signal on path 34a drives saturating amplifier 28 to the full positive saturation voltage so that motor 12 is maximally accelerated through conventional circuitry not shown. When, however, the frequency of output pulses 17 equals or exceeds the clock pulse frequency, the digits are not shifted to cell 32c; rather, the output of cell 32a is switched between 1 and 0 in response to arrival of an output pulse and a clock pulse to produce phase error clock signal 25. In the case where motor 12 is rotating in an overspeed condition the arrival of more tach pulses causes digits received at input 36c to be shifted up to cell 32b so as to produce an overspeed signal 36 on path 34b which is employed to reduce the motor speed. Thus, so long as the frequency of the output pulses is different from the frequency of the clock pulses, the motor is controlled in saturation; when the frequencies are approximately equal the relative phase between the two pulses is reflected at output 24 by phase error clock signal 25. When the output pulses occur exactly $\pi$ radians from the reference pulses the phase error clock signal is symmetrical and when the phases are other than as described above, the signal is asymmetrical to a degree proportional to the phase difference.

Figure 4:
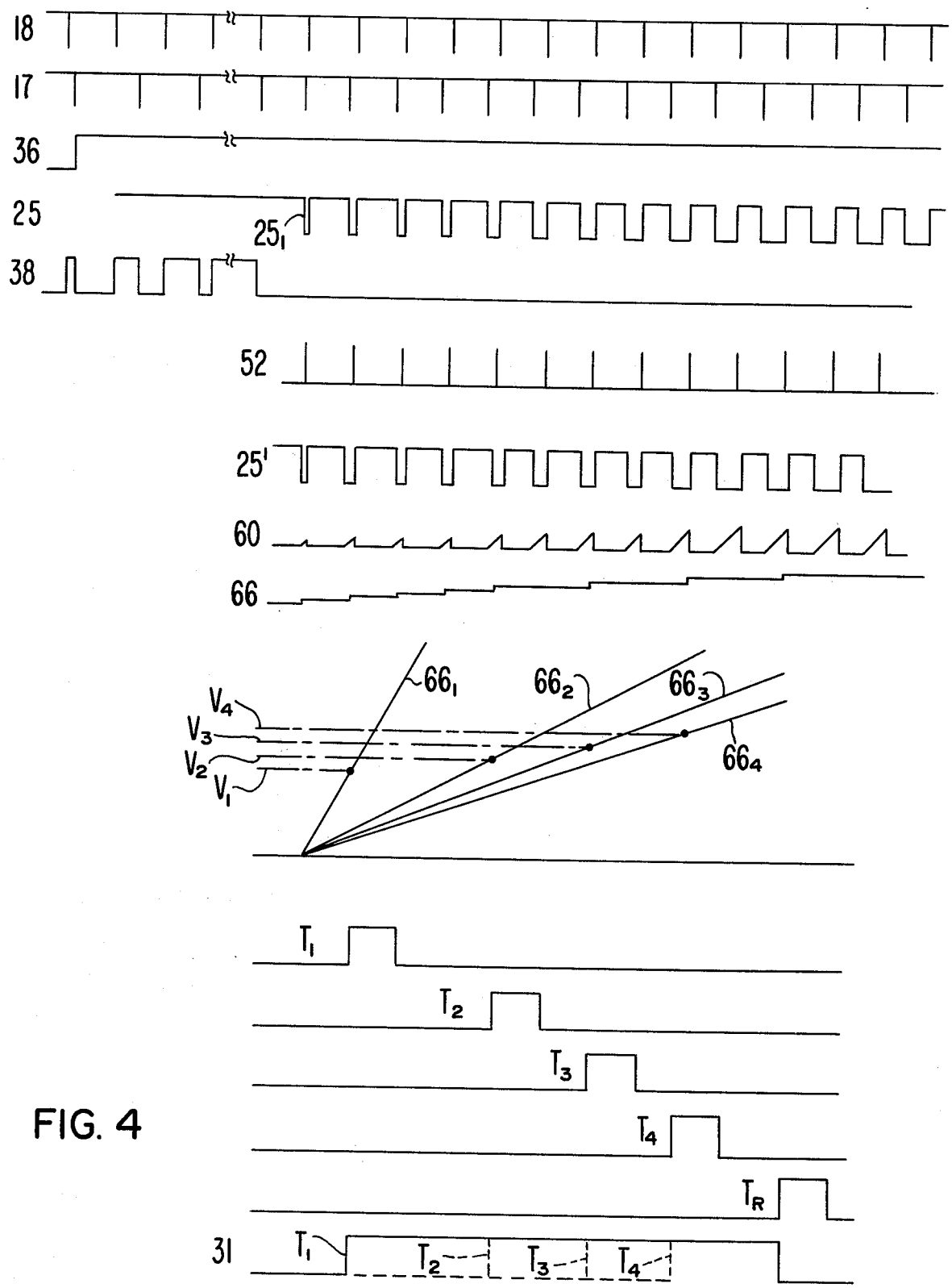
FIG. 4 is a timing diagram illustrating signal conditions in the system of FIGS. 1–3.

The elements constituting trajectory correcting lock circuit 30 are shown in FIG. 3. Phase error clock signal 25 is supplied over path 34a to an inverter 46 the output of which is connected to the input of a pulse shaper 48 and a time delay 50. Pulse shaper 48 produces a relatively narrow sampling pulse 52 coincident with the clock pulses. Time delay 50 can be a simple RC circuit which delays the phase error clock signal 25 by an amount slightly longer than the width of sampling pulses 52. The delayed phase error clock signal is shown at 25' in FIG. 4. The delayed signal is inverted by an inverter 54, and when the output of inverter 54 goes high, the capacitor 58 is charged up slowly and a ramp voltage is generated at the input of a voltage follower 62. When the output of inverter 54 goes low, charges on capacitor 58 are discharged very quickly and the voltage is returned to substantially zero volts. The ramp voltage on the capacitor 58 is shown in FIG. 4 at 60. Such voltage signal is supplied through voltage follower 62 to a sample and hold circuit 64. Voltage follower 62 can be implemented in a 741 integrated circuit which is an operational amplifier; the voltage follower provides isolation of the ramp produced across capacitor 58. The output of sample and hold circuit 64 is a DC signal the magnitude of which is altered or updated each time a pulse from pulse shaper 48 occurs. Such output is shown in FIG. 4 at 66. The slope of curve 66 is indicative of the time rate of change of phase error. If at the time that phase/frequency detector 20 starts producing a phase error clock, the initial error rate condition is small, the slope of signal 66 will be relatively slight; if at that time the rate of phase error is relatively large, the slope of curve 66 will be steeper. Below curve 66 FIG. 4 are shown specific exemplary rates of change of phase error there being a relatively high rate $66_1$, a medium high rate $66_2$, a medium rate $66_3$, and a low rate $66_4$. Determination of the specific time rate of change of phase error is detected according to the invention and is employed to control the magnitude and/or duration of the counter torque pulse 31 that is applied at summing point 33.

Phase error rate signal 66 is connected over a circuit path 68 to a quad voltage comparator circuit 70 which can be implemented in a single integrated circuit chip available under the commercial description 339. Quad comparator 70 includes four individual comparator elements $70_1$, $70_2$, $70_3$ and $70_4$. Each comparator element produces a true output signal when the voltage level of signal 66 supplied on conductor 68 exceeds a reference voltage supplied to the element. Four reference voltages having the magnitude $V_1$, $V_2$, $V_3$, and $V_4$ are indicated in FIG. 3, the reference voltages having magnitudes such that $V_1 < V_2 < V_3 < V_4$. Thus, comparator $70_1$ produces a true output at a time when signal 66 exceeds reference voltage $V_1$; comparator $70_2$ produces an output when signal 66 exceeds reference voltage $V_2$; comparator $70_3$ produces a true output when signal 66 exceeds reference voltage $V_3$; and comparator $70_4$ produces a true output when signal 66 exceeds reference voltage $V_4$. Such true outputs of the comparators are connected to one of two inputs of respective AND gates $72_1$, $72_2$, $72_3$ and $72_4$. Gates $72_1$–$72_4$ are thus enabled sequentially at a rate corresponding to the rate of change of phase error. A timing circuit is provided to permit derivation of a signal corresponding to such rate.

The provision of four discrete reference voltages affords a high degree of correlation between the shape of curve 66 and the duration of counter pulse 31. In many practical embodiments of the invention, however, adequate correlation can be achieved by providing a single reference voltage and comparing the magnitude of the phase error rate signal with the reference voltage at time intervals established by timing circuitry shown in FIG. 3 and described below.

The timing circuit includes a counter 74 which counts the phase error clock pulses 25 that are supplied to the input of the counter over a circuit path 76. For assuring that counter 74 responds only to the phase error clock signal, the reset terminal of the counter is connected to underspeed signal 38 which continually resets counter 74 until frequency equality between output pulses 17 and clock pulses 18 is detected. The counter is triggered by the positive going portion of signal 25 (the negative going portion after inversion) so that counter 74 counts at the rate of clock pulses 18.

The counter outputs are connected to a gating circuit 78 which produces timing outputs at times designated $T_1$, $T_2$, $T_3$, $T_4$ and $T_R$. The particular configuration of the gates in the gate circuit 78 is well understood by those skilled in the art and need not be further elaborated. Suffice it to say, the specific timing outputs are selected on the basis of the operating conditions of the speed control system. For example, in one system designed according to the present invention, $T_1$ appears at two counts, $T_2$ at five counts, $T_3$ at seven counts, $T_4$ at nine counts and $T_R$ at eleven counts.

Timing pulses $T_1$–$T_4$ are coupled to the second inputs of respective AND gates $72_1$–$72_4$ so that the output of an AND gate is true if the phase error signal 66 exceeds one of the reference voltages $V_1$–$V_4$ at a particular time period established by timing pulses $V_1$–$T_4$.

The outputs of AND gates $72_1$–$72_4$ are connected to an OR gate 80, the output of which goes high at a time that corresponds to the phase error rate. The output of OR gate 80 goes high earlier for high phase error rates than it does for low phase error rates. The output of gate 80 is connected on a circuit path 82 to the set input of a RS flip-flop 84. The Q output of flip-flop 84 is connected to the set input of a latch 86, the Q output of which is the counter torque pulse 31. Timing pulse $T_R$ is connected to the reset input of latch 86 through an OR gate 88. Also connected to the reset input of latch 86 is underspeed signal 38 which is connected over circuit path 34c to retain flip-flop 84 and latch 86 in a reset condition until detector 20 changes from the frequency mode to the phase mode.

Before describing the operation of the circuit of FIG. 3, a description of the theoretical basis for design and operation of the circuit will be given so as to enable those skilled in the art to select the correct values for reference voltages $V_1$–$V_4$ and the time periods for timing pulses $T_1$–$T_4$.

Figure 5:
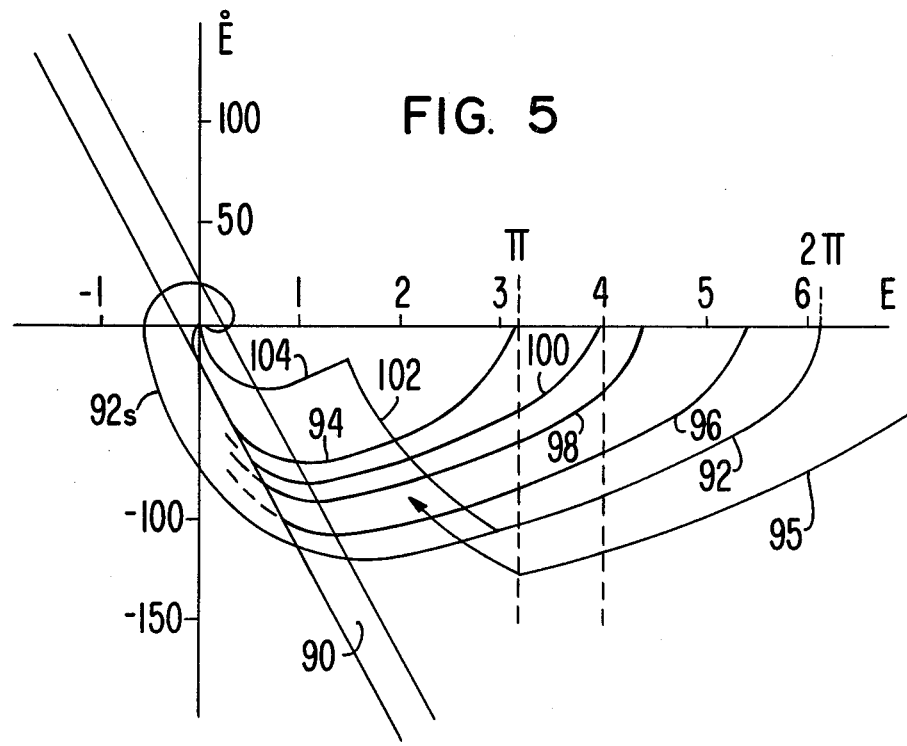
FIG. 5 is a plot in the phase plane of phase error versus phase error rate in a system embodying the invention.

FIG. 5 is a phase plane plot wherein the phase error E in radians is plotted on the abscissa and the time rate of change of phase error E in radians per second is plotted on the ordinate. The range of linear operation of the system is a narrow zone 90 in which range the system operates after it is locked up. If error reduction occurs along a line, such as line 92, it can be seen that system operation goes through the linear range, resaturates along line segment $92_s$ and then it returns to the linear range only to resaturate again after which the system settles down finally at the focus point in the linear region. Because operation along trajectory 92 is oscillatory, excessive time is required for the system to reach a locked condition. Trajectory 92 should be contrasted, however, with the critical trajectory indicated at 94. As can be seen, the critical trajectory enters the linear zone 90 and is tangent to the boundary thereof so that it remains within the zone until lock is achieved. A system that embodies the invention senses the magnitudes of phase error and of time rate of change of phase error, derives a signal indicative of the trajectory associated with such magnitudes, and if the trajectory associated with such magnitudes is below the critical trajectory, generates a counter torque pulse to shift the trajectory to a new trajectory on or above the critical trajectory. It has been found that a practical system can be employed by providing four counter torque pulses the first sufficing to correct for trajectories between the worst case trajectory 95 and trajectory 96, the second between trajectory 96 and trajectory 98, the third between trajectory 98 and trajectory 100, and the fourth between trajectory 100 and critical trajectory 94. Exemplifying the effect of the first counter torque pulse is curve 102 on which the system operates during application of the counter torque pulse to shift system operation to a trajectory 104 which is above the critical trajectory. Because the amount of correction required for each band is different, the duration of the counter torque pulse applied for the respective bands is different.

The apparatus of the invention achieves trajectory correction and therefore entry into the linear region without oscillation in the following manner. Let it be assumed that motor 12 is stationary and is activated by causing amplifier 28 to supply the maximum positive saturating voltage to the motor. The motor rapidly accelerates in a substantially open loop condition. So long as the frequency of output pulses 17 is less than the frequency of clock pulses 18, detector 30 operates in a frequency mode in consequence of which the phase error clock signal remains high so as to maintain the system in saturation at the positive voltage of amplifier 28. When, however, the frequency of output signal 17 is equal to or greater than the frequency of clock pulses 18, detector 20 operates in a phase mode to produce phase error clock signal 25. The first phase error clock signal indicated at $25_1$ in FIG. 4 starts counter 74. The phase error clock signal 25 also generates a ramp voltage on capacitor 58 through delay 50, inverter 54 and transistor 56, thus causing sample and hold circuit 64 to produce, at times dictated by the pulses from the pulse shaper 48, an analog voltage that varies as a function of the rate of change of the phase error. Depending on the phase difference between output pulses 17 and clock pulses 18, when the detector transfers to the phase detection mode, a signal is produced on circuit path 68. Such signal is compared with reference voltages $V_1$-$V_4$ in quad comparator 70 so that the timing at which gates $72_1$-$72_4$ are enabled is appropriate to detect the time rate of change of phase error and correlate the trajectory by defining a curve $66_1$, $66_2$, $66_3$ or $66_4$. If at time $T_1$ the curve has reached a level equal to or greater than reference voltage $V_1$, AND gate $72_1$ will produce an output which through OR gates 80 sets flip-flop 84 which in turn sets latch 86 to produce a counter torque pulse commencing at time $T_1$ (see FIG. 4). Such circuit condition is indicative of operation in the band between trajectories 95 and 96 in FIG. 5 and would produce the maximum counter torque pulse necessary to shift the trajectory to a position above critical trajectory 94. If the rate of change of phase error is lower, signal 66 does not reach a magnitude equal to $V_1$ by time $T_1$, and no output is produced by AND gate $72_1$. If the phase error rate is such that signal 66 exceeds reference voltage $V_2$ at time $T_2$, the counter torque pulse commences at time $T_2$. A still lower phase error rate would fail to enable gate $72_2$ by time $T_2$ but would enable gate $72_3$ at time $T_3$. This condition produces a counter torque pulse commencing at time $T_3$. Finally, a very low phase error rate would exceed $V_4$ only at time $T_4$, whereupon the counter torque pulse would commence at time $T_4$. The occurrence of timing pulse $T_R$ terminates the counter torque pulse because such timing pulse is connected to the reset input of latch 86.

Thus, it will be seen that the present invention provides a novel circuit for producing a properly timed counter torque pulse so as to decelerate the motor as it approaches operation in the linear region. Thus, the system can enter the locked condition directly and without oscillation or like instabilities. Accordingly, a lock is assured and the time for achieving lock-up is materially reduced.

The foregoing description of a specific embodiment of the invention covers the case where the motor starts at zero speed so that the frequency of the output pulses produced by the tachometer is initially less than the reference frequency. The system can also be employed where the variable output frequency approaches the reference frequency from a higher frequency. In such application of the invention, underspeed signal 38 is replaced by an overspeed signal and the measurement of phase error is based on the amount of phase lead rather than the amount of phase lag. Moreover, the polarity of the counter torque injected at summing point 33 will be opposite to that described hereinabove.

The number of reference voltages $V_1$-$V_4$ and the number of timing pulses $T_1$-$T_4$ can be varied depending on the specific application. There can be a greater number of reference voltages and timing periods or a lesser number, depending on the specific nature of the system as manifested by the trajectories on the phase plane.

Although one embodiment of the invention has been shown and described it will be obvious that other adaptations and modifications can be made without departing from the true spirit and scope of the invention.

What is claimed is:

1. A phase lock control system for locking output pulses from a variable frequency pulse generator in phase with a series of reference pulses that recur at regular intervals comprising a comparator for receiving said output pulses and said reference pulses and producing a phase error signal representative of the phase difference therebetween, means responsive to said error signal for driving the variable frequency pulse generator in a sense to reduce said phase error signal, means coupled to the comparator for deriving from the phase error signal an error rate signal indicative of the rate of change of 2. A system according to claim 1 wherein said error rate signal deriving means includes means forming a signal having a slope indicative of the error rate, and wherein said overriding means includes means producing a gating pulse when said error rate signal exceeds a reference signal so that the gating pulse occurs at a time indicative of said error rate, and means for energizing said overriding means in response to said gating pulse.

3. A system according to claim 2 wherein said overriding means energizing means comprises a timer for generating a plurality of timing pulses, wherein said gating pulse producing means comprises a plurality of AND gates, means coupling said timing pulses to said AND gates for sequentially enabling said AND gates, and means comparing said error rate signal to a reference signal and producing an activating signal for activating said AND gates when said error rate signal exceeds the reference signal so that one of said AND gates produces said gating pulse upon coincidence of said activating signal and a timing pulse, and wherein said system includes means responsive to a subsequent one of said timing pulses for deenergizing said overriding means.

4. In a phase lock control system of the type having an output device providing a series of output pulses at an output rate, said output device having an input and means for varying the output rate in proportion to the magnitude of a signal applied to the input, means for comparing the phase and frequency of said output pulses with the phase and frequency of a series of regularly recurring reference pulses and producing an error signal indicative of the phase difference therebetween, and means for coupling said error signal to said input to vary the output rate in a given direction to reduce the error signal, the improvement comprising means responsive to the error signal for producing an error rate signal proportional to the time rate of change of said error signal, means for producing a counter torque signal corresponding to said error rate signal, and means for applying said counter torque signal to said coupling means to effect variation of said output rate in opposition to the given direction.

5. A system for phase locking of output pulses from a controllably variable pulse generator with reference pulses that regularly recur at a given period from a condition at which the output pulse period is substantially different from said given period comprising a detector having inputs coupled in receiving relation to the output pulses and the reference pulses for producing a frequency error signal when the output pulse frequency is different from the reference pulse frequency, means coupling said frequency error signal to said pulse generator for varying the output pulse frequency in a direction to reduce the frequency error signal, said detector having means responsive to frequency equality between the output pulses and the reference pulses for producing a phase error signal proportional to the amount by which the phase of the output pulses differs from a point substantially midway between the reference pulses, means conveying said phase error signal to said pulse generator for varying the phase in a given direction to reduce the phase error, means for deriving a counter-signal having a duration corresponding to the time rate of change of the phase error signal, and means for applying said counter-signal to said conveying means in a sense opposite said given direction to drive said pulse generator into phase lock with the reference pulses without oscillation.

6. In a phase lock motor speed control system of the type including a saturating amplifier having an output connected to the motor for energizing the motor, said saturating amplifier having an input and operating in a positive saturated mode for driving the motor in a substantially open loop mode in the first direction, a negative saturated mode for driving the motor in a second opposite direction in a substantially open loop mode, and a linear mode intermediate said saturation regions for driving the motor at a speed proportional to a signal applied to said input, a tachometer in driven relation to the motor for producing a series of output pulses having a frequency proportional to the speed of the motor, a comparator for comparing the frequency of the output pulses with the frequency of a series of reference pulses that regularly recur at a period of $2\pi$ radians, said comparator producing a frequency error signal indicative of the difference in frequency between the tachometer pulses and the reference pulses, and means for coupling the error signal to the amplifier input to drive said motor in the positive saturated mode to vary the frequency of the output pulses in a direction to reduce the frequency error signal, the improvement comprising means responsive to equality of the output pulse frequency and the reference pulse frequency for producing a phase error signal that is proportional to the phase difference between the output signal and the reference signal, means responsive to the phase error signal for producing a phase error rate signal proportional to the time rate of change of the phase error signal, means responsive to the phase error signal and the phase error rate signal for producing a counter torque pulse having duration corresponding to the phase error and the phase error rate, and means for applying said counter torque pulse to said amplifier input for causing said amplifier to operate in the negative saturated mode for the duration of said counter pulse so as to slow the motor as it enters the linear mode.

7. A method for rapidly phase locking a motor to the frequency of a series of regularly recurring reference pulses comprising the steps of producing a series of output pulses at a frequency corresponding to the speed of the motor, comparing the frequency of the output pulses with the frequency of the reference pulses to produce an error signal indicative of the difference between the frequencies, employing said error signal to produce a motor drive signal to vary the motor speed in a given direction to reduce the error signal so that frequency equality between the output pulses and the reference pulses is achieved, measuring the phase difference between the output pulse and the reference pulse, producing a phase error signal proportonal to such difference, measuring the time rate of change of such phase error signal to produce a phase error rate signal, and applying to said motor for a duration corresponding to the magnitudes of said phase error and phase error rate signals a counter torque pulse so as momentarily to override the motor drive signal.

\* \* \* \* \*

UNITED STATES PATENT OFFICE
CERTIFICATE OF CORRECTION

Patent No. 4,193,020   Dated March 11, 1980

Inventor(s) Hubert Song

It is certified that error appears in the above-identified patent and that said Letters Patent are hereby corrected as shown below:

In column 8, line 64, after the words "change of" insert the following:

--said phase error signal, and means for applying said error rate signal to said variable frequency pulse generator for momentarily overriding the phase error signal so as to provide a drive signal of the opposite sense to said variable frequency generator, said overriding means reducing the phase error rate of the system to afford nonoscillatory phase lock of the output pulses with the reference pulses.--

Signed and Sealed this

Twenty-fourth Day of June 1980

[SEAL]

Attest:

SIDNEY A. DIAMOND

Attesting Officer   Commissioner of Patents and Trademarks